United States Patent

[11] 3,620,877

| [72] | Inventor | Robert E. Anderson<br>Kalamazoo, Mich. |
|---|---|---|
| [21] | Appl. No. | 754,132 |
| [22] | Filed | July 25, 1968 |
| [45] | Patented | Nov. 16, 1971 |
| [73] | Assignee | Mueller Color Plate Company<br>Battle Creek, Mich. |

[54] METHOD OF MAKING ELECTROTYPE PRINTING PLATES
5 Claims, 3 Drawing Figs.

[52] U.S. Cl. .................................................. 156/285, 101/401.1
[51] Int. Cl. ...................................................... B32b 31/04
[50] Field of Search ................................................ 156/285, 286, 287, 212, 219; 101/401.1, 395, 401.2

[56] References Cited
UNITED STATES PATENTS

| 2,993,824 | 7/1961 | Richaudeau.................. | 156/285 |
| 3,029,730 | 4/1962 | Parrish et al................... | 101/401.1 |
| 3,031,960 | 5/1962 | Bishop........................... | 156/285 X |
| 3,130,101 | 4/1964 | Gittins et al. .................. | 156/285 X |
| 3,211,091 | 10/1965 | Garrett.......................... | 101/401.1 |
| 3,277,823 | 10/1966 | Redding........................ | 156/285 X |
| 3,311,053 | 3/1967 | Blackmore..................... | 101/401.1 |
| 3,338,163 | 9/1967 | De Maria et al. .............. | 101/401.1 |
| 3,493,451 | 2/1970 | Beery............................. | 156/285 X |

FOREIGN PATENTS

| 911,139 | 11/1962 | Great Britain................ | 156/287 |

Primary Examiner—Benjamin R. Padgett
Assistant Examiner—Gary G. Solyst
Attorney—Fred Wiviott ABSTRACT: The method of manufacturing an electrotype printing plate comprising the steps of electroforming a shell having raised characters on its front face and corresponding recesses on its backface, fusing a nylon coating to the back of the plate to fill the recesses, providing a metallic backing plate having a predetermined curvature, applying thermosetting adhesive to one of the backing plate or the coating. The plate is applied to vacuum apparatus comprising an apertured saddle member which includes heating means and diaphragm means constructed and arranged to cover the plate. The plate is heated and a vacuum is simultaneously drawn through the apertures wherein the diaphragm firmly presses the plate to the backing member and the adhesive is cured.

PATENTED NOV 16 1971 3,620,877

INVENTOR,

ROBERT E. ANDERSON

By Fred Winiott
Attorney

METHOD OF MAKING ELECTROTYPE PRINTING PLATES

BACKGROUND OF THE INVENTION

This invention relates to a new and improved method for manufacturing electrotype printing plates.

Electrotype printing plates are generally manufactured by electrolytically depositing a metallic material, such as copper, on a mold to form a thin shell having raised characters on its front face and corresponding depressions on the backface thereof. The back of the plate is filled with a layer of plastic material, such as nylon, which is fused to the shell and any excess material is shaved off to provide a plate of uniform thickness. The nylon backed shell is then joined to an aluminum sheet by an adhesive and the application of heat and pressure. The plate thus formed is then bent into a curved configuration by means of a press. This tended to result in separation of the adhesive bond and to cause the plate to vary in thickness as certain portions would compress and others stretch. Such plates not only had to be reduced to a uniform thickness but were also prone to delaminate during a printing operation.

Another prior art method was to preform the metallic backing plate in a curved configuration and then to apply the nylon backed shell by means of heat and pressure. Because of the difficulty in applying pressure uniformly over the entire face of the plate due to its irregular surface formed by the raised characters, such plates would also tend to have a nonuniform thickness. As a result, expensive equipment was required to not only press the members together but to reduce the assembled plate to uniform thickness.

It is an object of the invention to provide a new and improved method of manufacturing electrotype printing plates.

A more specific object of the invention is to provide a new and improved method of joining a plastic backed electrotype shell to a metallic backing member.

Another object of the invention is to provide an electrotype printing plate which is not subject to delamination.

A still further object of the invention is to provide a new and improved method of joining a plastic backed electrotype shell to a metallic backing member, wherein uniform thickness can be maintained without the mechanical cutting operation after the members have been joined.

A further object of the invention is to provide a new and improved method for making electrotype printing plates.

These and other objects and advantages of the instant invention will become more apparent from the detailed description thereof taken with the accompanying drawings.

SUMMARY OF THE INVENTION

According to one of its aspects, the invention comprises the method of manufacturing an electrotype plate, comprising the steps of forming a shell having raised characters on its face and corresponding recesses on its back, covering the back of the plate with a first layer of material, providing a perforated backing member, applying an adhesive coating to one of the layer or backing member, applying the backing member to the coating, placing a diaphragm in engagement with the front face of the shell and simultaneously heating and drawing a vacuum through the perforations in the backing member to cure the adhesive and to draw the diaphragm into uniform high-pressure engagement with the front of the shell to provide uniform high-pressure engagement between the layer and the backing member.

According to one of its aspects, the invention comprises the combination of, a metallic support member having a generally arcuate in cross section upper surface and at least one aperture means formed therein, diaphragm means for covering the upper surface of the support member, and means for drawing a vacuum through the aperture means.

DESCRIPTION OF THE PREFERRED EMBODIMENTS

Figure 1:
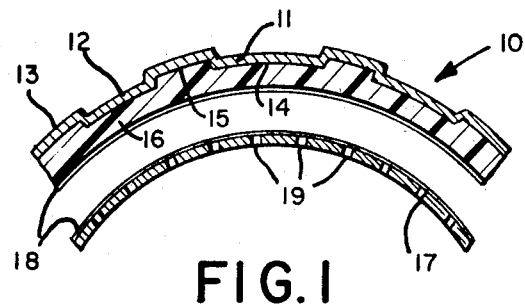
FIG. 1 schematically illustrates a cross section through a coated electrotype shell and a backing plate member prior to assembly.

Referring now to the drawings in greater detail, FIG. 1 shows an electrotype plate subassembly 10 consisting of a metallic shell 11 that has been formed by electrolytically depositing a metal, such as copper, on a mold or matrix. The shell 11 thus formed has a front face 12 provided with raised characters 13 and a rear face 14 having corresponding depressions 15. A suitable thermoplastic material 16, such as nylon, is joined to the rear face 14 by fusion and compression, so as to fill the depressions 15. After the nylon layer 16 has been joined to the shell 11, the assembly thus formed is trimmed of excess nylon and then drawn through a shaving machine (not shown) to reduce the layer 16 to a uniform thickness.

For a more complete description of the method of joining the thermoplastic layer 16 to the shell 11, reference is made to my copending application Ser. No. 747,599, filed July 25, 1968 and now U.S. Pat. No. 3,526,190 and assigned to the assignee of the present invention.

A metallic backing member 17 is joined to the layer 15 by means of an adhesive 18 to give the coated shell 11 a desired degree of stiffness. The metallic backing member 17 may be formed of any suitable material such as aluminum and may be provided with a plurality of perforations 19 whose purpose will be described hereinbelow. The aluminum member 17 may also be roughened by sandblasting and cleaned in a trichlorethylene vapor in addition to being curved to the desired arcuate configuration.

Figure 2:
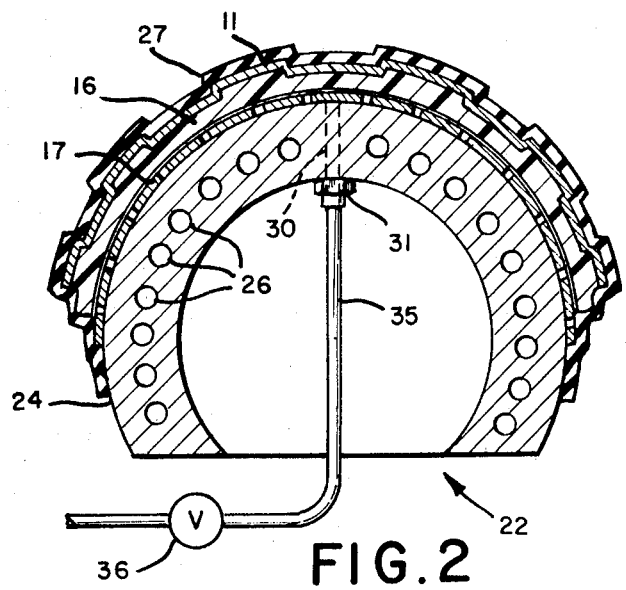
FIG. 2 schematically illustrates a cross section through apparatus for joining a coated electrotype shell and backing plate member according to the instant invention.
Figure 3:
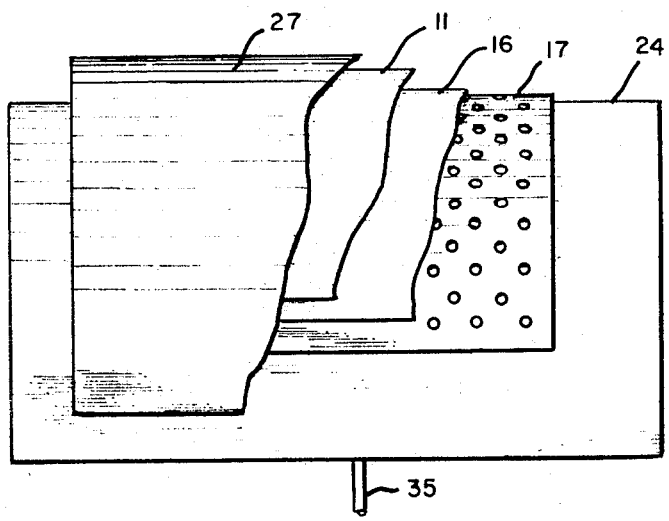
FIG. 3 is a top plan view, with parts broken away of the apparatus shown in FIG. 2.

FIGS. 2 and 3 illustrate a vacuum apparatus 22 for joining the nylon-coated shell 16 to the backing member 17. Vacuum assembly 22 includes a saddle member 24 which may be generally rectangular in planar view and arcuate in cross section according to the desired radius of curvature of the finished plate. The radius and circumferential extent of the saddle member 24 will be determined by the desired size of the plate assembly being formed. The saddle member 24 may be a relatively heavy metal member which may be provided with heating means such as passages 26 for the circulation of a heating fluid, such as steam. A diaphragm 27, which may be of any suitable material such as rubber, and which is substantially larger than the saddle 24, is provided for covering the entire assembly. While the diaphragm is separate from the saddle 24 in the preferred embodiment, those skilled in the art will appreciate that it may also be suitably attached, as by a hinged frame, for example.

At least one aperture 30 is provided through the saddle 24 and its lower end is provided with a pipe coupling 31. A pipe 35 is connected to the coupling 31 and includes a valve 36 for connection to a suitable evacuator (not shown).

It will be recalled that when it is desired to join the assembly 10 to the backing plate 17, a coating of suitable adhesive 18 is first applied to at least one of the lower surface of the nylon layer 16 and the backing plate 17. The member 17 is then placed over the saddle 25 as shown in FIG. 2, and the assembly 10 applied thereto. The diaphragm 27 is then placed over the assembly as shown in FIG. 2, with the diaphragm 27 being relatively slack. The valve 36 is then operated to couple the underside of the member 17 to the evacuator (not shown) and heating fluid is simultaneously circulated through the passages 26. This partial vacuum beneath the member 17 draws the diaphragm 27 tightly against the upper surface of the shell 11 to force the layer 16 into high-pressure engagement with the backing member 17. The vacuum and the heat cure the adhesive, which provides a firm bond between the member 17 and the layer 16. Because of the pliability of the diaphragm 27, it is able to bear against the surface of the plate 11 with substantially uniform pressure, regardless of irregularities in the surface resulting from the characters 13.

While any suitable adhesive may be employed, one which is found to be operable is type WE 4057-D, manufactured by the American Cyanamid Company. The adhesive may be applied to both the backing member 17 and the coating 15 or to either one of them. If adhesive is applied to the nylon 15, a small quantity of resorcinol may be added. This tends to homogenize the adhesive and the nylon at the surface and tends to make the nylon tacky.

According to the preferred embodiment of the invention, the temperature of the saddle 24 may be maintained at a temperature of approximately 275° F. during the adhesive-curing operation. This is less than the fusion temperature of the nylon so that there will be no penetration of the member 17 into the layer 16. Thus, after the plate 38 as shown in FIG. 4 has been removed from the vacuum apparatus 22, it will have the dimensional thickness of its various components which dimensions are not altered during the laminating operation just discussed. As a result, it is not necessary to perform any subsequent cutting operations on the backing member 17.

Those skilled in the art will also appreciate that a contact cement or adhesive may also be employed, in which case the heating step will be eliminated.

The member 17 is preferably provided with apertures 19 which allow the escape of air from between the coating 16 and the backing member 17, so that a firm, uniform bond will be provided over the entire area of the members.

While only a single embodiment of the instant invention has been shown and described, it is not intended to be limited thereby but only by the scope of the appended claims:

I claim:

1. A method of manufacturing an electrotype plate comprising the steps of, forming a shell having characters on one face thereof,
   bonding a layer of flexible plastic to the other face of said shell,
   forming a perforated metallic backing member in a generally arcuate configuration,
   placing said backing member on a support for supporting the same,
   applying an adhesive coating to at least one of said backing member and said layer,
   applying said layer to one face of said backing member with said adhesive disposed therebetween, whereby the shell and layer assume the configuration of the backing member,
   applying a diaphragm to the one face of said shell,
   applying a vacuum at the other face of said backing member to uniformly distribute the pressure differential between the one face of said shell and the other face of said backing member over the surface of said shell to force said shell and layer into substantially uniform high-pressure engagement with said backing member,
   and curing the adhesive coating to secure said shell and layer to the backing member.

2. The method set forth in claim 1 wherein said adhesive coating is applied to said layer of material, and the step of homogenizing said adhesive coating and said layer of material at the surface of the latter.

3. The method set forth in claim 1 wherein said layer of material is reduced to a uniform thickness prior to the application of said adhesive coating.

4. The method set forth in claim 3, wherein said diaphragm is applied to the one face of said shell and hermetically sealing said diaphragm to said backing member.

5. The method set forth in claim 4, wherein said adhesive coating is thermosetting and said layer comprises nylon and including the step of heating said backing member to a temperature below the fusion temperature of said layer for curing said adhesive coating.